United States Patent [19]
Brabston et al.

[11] Patent Number: 5,639,195
[45] Date of Patent: Jun. 17, 1997

[54] HELICAL PANEL FASTENER

[75] Inventors: William Newell Brabston; Philip G. Malone, both of Vicksburg, Miss.; Roger H. Jones, Jr., Reno, Nev.

[73] Assignee: The United States of America as represented by the Secretary of the Army, Washington, D.C.

[21] Appl. No.: 613,796

[22] Filed: Mar. 1, 1996

[51] Int. Cl.$^6$ .............................. F16B 35/00; F16B 35/04
[52] U.S. Cl. .......................... 411/392; 411/411; 411/425; 411/438
[58] Field of Search .......................... 411/392, 338, 411/339, 411, 438, 535, 536, 424, 425; 403/43, 229

[56] References Cited

U.S. PATENT DOCUMENTS

| | | | |
|---|---|---|---|
| 368,372 | 8/1887 | Bingham | 411/411 X |
| 2,121,784 | 6/1938 | Busby | 411/438 X |
| 2,464,808 | 3/1949 | Hattan | |
| 2,604,135 | 7/1952 | Rydberg | |
| 2,775,992 | 1/1957 | Smith | |
| 3,127,147 | 3/1964 | Spangenberg | 411/411 X |
| 3,272,496 | 9/1966 | Halopoff et al. | |
| 3,638,700 | 2/1972 | Onufer | |
| 3,653,171 | 4/1972 | Galloway | |
| 4,130,929 | 12/1978 | Dzus | |
| 5,101,213 | 3/1992 | Harada et al. | 411/438 X |

*Primary Examiner*—Neill R. Wilson
*Attorney, Agent, or Firm*—Luther A. Marsh

[57] ABSTRACT

Wall panels are fastened to walls or to one another with pairs of identical helically-wound fastener rods which engage each other by turning. Spacer tubes are provided to maintain the desired spacing between panels, or between panels and walls, and to align the helically-wound sections of the fasteners before engaging. Guide prongs may also be used to assist in the alignment of the fasteners with each other before engaging.

16 Claims, 2 Drawing Sheets

HELICAL PANEL FASTENER

GOVERNMENT INTEREST STATEMENT

The invention described herein may be manufactured, licensed, and used by or for governmental purposes without the payment of any royalties thereon.

BACKGROUND OF THE INVENTION

1. Field of Invention

This invention relates to a novel fastener for fastening wall panels. More specifically, it relates to two opposing helical, intertwining fasteners that hold two wall panels together with a predetermined spacing therebetween, or fasten wall panels to walls with a predetermined spacing.

2. Prior Art

U.S. Pat. Nos. 2,464,808, 2,604,135, 2,775,992, and 3,638,700 disclose fasteners based on the engagement of male-female threads. U.S. Pat. No. 3,653,171 discloses a spiral wire fastener for attaching sheet metal sections to each other. U.S. Pat. No. 3,272,496 discloses a spring connection for garage doors. U.S. Pat. No. 4,130,929 discloses a fastener having a wound spring. None of the prior art fasteners accomplish the object of the present invention of fastening panels to walls or to each other at a predetermined spacing.

The object of the panel fasteners of the present invention is to provide a simple and economical means of holding and fastening any type of panels together with pairs of identical fasteners that are easy to assemble, specifically in applications wherein a predetermined spacing between such panels must be maintained. Another object is to provide fasteners for connecting panels to walls with a predetermined spacing.

SUMMARY OF THE INVENTION

The helical fasteners of this invention are suitable for fastening any type of parallel spaced panels together, specifically in applications wherein such panels must be fastened with a predetermined spacing between panels. An important application of the helical fasteners of this invention is in the construction of forms for concrete placement. Another application of these fasteners is in mounting panels parallel to walls with a predetermined spacing between the panels and the walls.

Each pair of fasteners for fastening two parallel spaced panels to one another with a predetermined spacing comprises the following elements: two fasteners each having a fastener rod having a straight section and a helically-wound section; and means for rotating the rod, the rotating means being rigidly fixed to the end of the straight section. The rotating means is disposed on the front of each panel through an opening in the panel. Turning the rotating means engages two opposing helically-wound sections of two fastener rods and causes the helically-wound sections to intertwine and rigidly to hold the two parallel spaced panels in place.

In an alternate embodiment of this invention for fastening parallel space panels to walls at a predetermined spacing, one fastener is provided with rotating means affixed to the panel, and the straight section of the fastener rod of the other fastener is rigidly attached to the wall. Turning the rotating means of the first fastener causes the helically-wound sections of the fastener rods to intertwine and rigidly to fasten the panel to the wall.

In both embodiments of the invention, the fastener rods are enclosed in spacer tubes which provide alignment of the helically-wound sections of the fastener rods before engaging and intertwining, and which furthermore assure the desired spacing between panels, or between panels and walls.

An advantage of the fasteners of this invention is the fact that only one type of fastener rod needs to be stocked, as opposed to fasteners having parts with male and female threads, for which two sets of parts must be stocked.

DETAILED DESCRIPTION OF PREFERRED EMBODIMENTS

The two principal embodiments of this invention are for fastening parallel spaced panels to one another, and for fastening panels parallel to walls, with predetermined spacing between panels, or between panels and walls.

Figure 1:
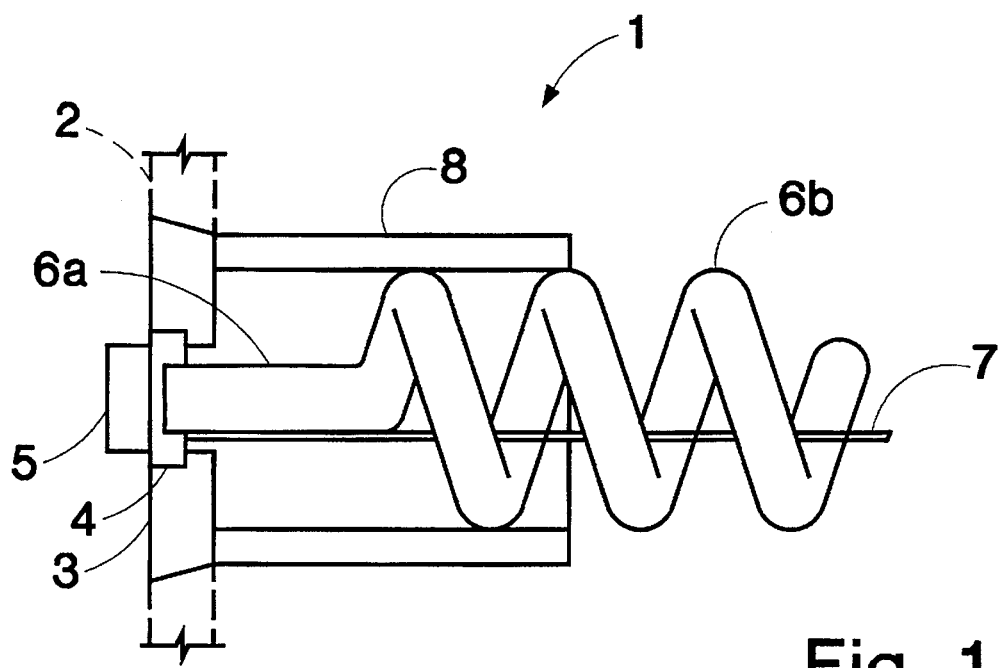
FIG. 1 is a side view of one of the fasteners of this invention.
Figure 2:
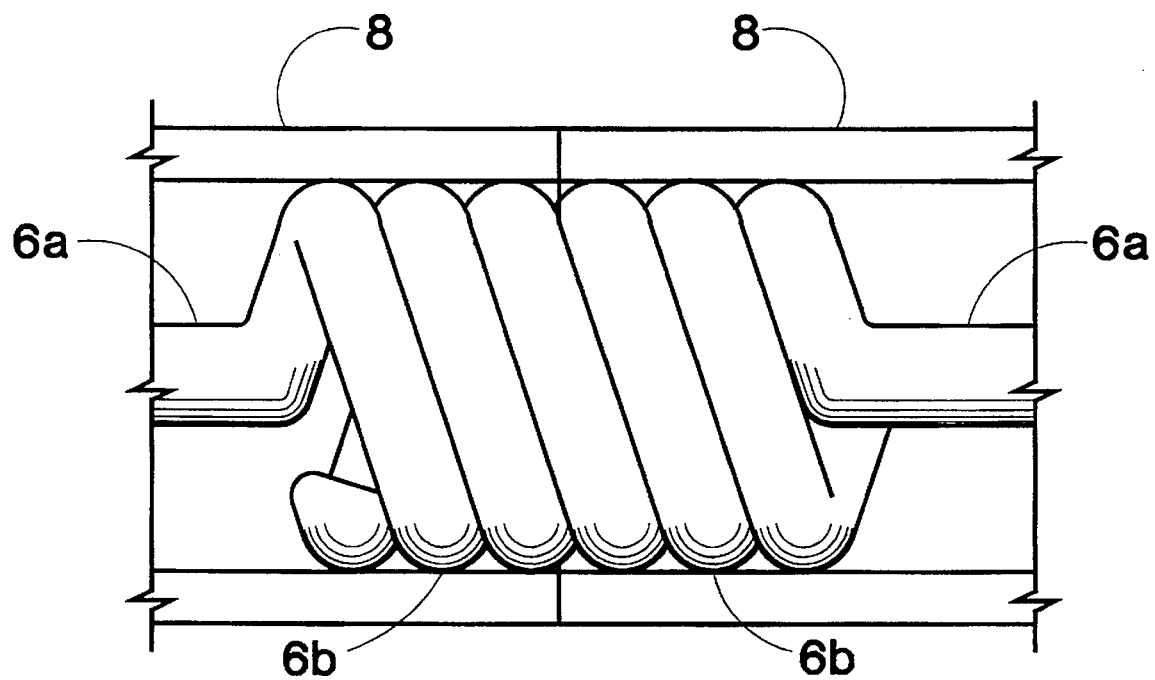
FIG. 2 is a side view of the helically-wound sections of two fastener rods intertwined.
Figure 3:
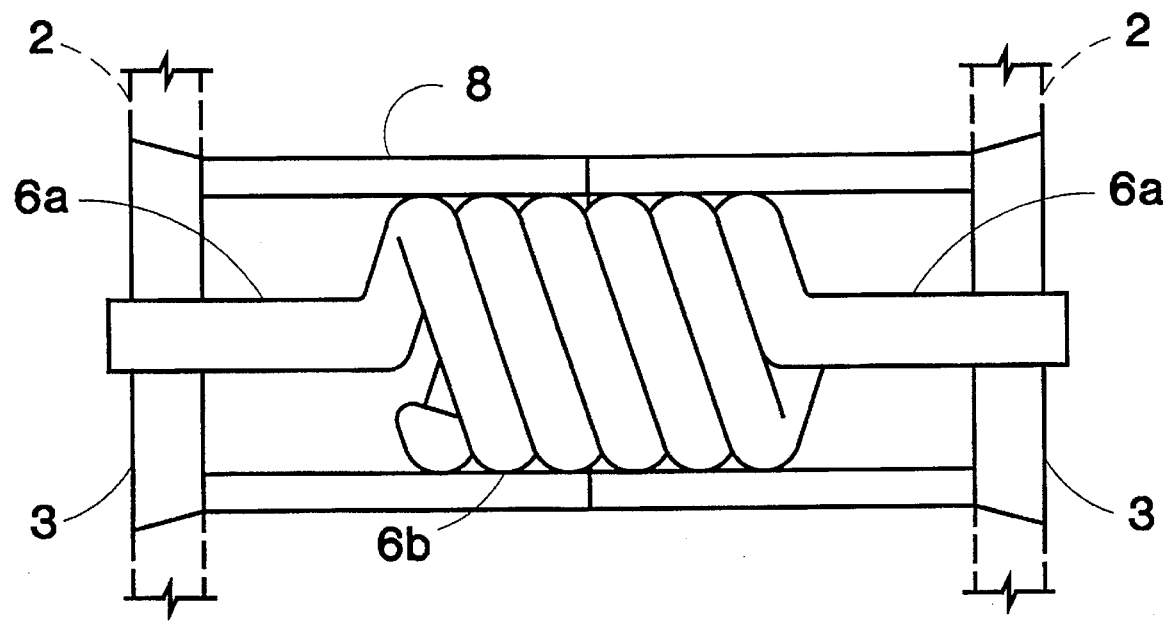
FIG. 3 is a side view of two panels fastened to each other.

In the preferred embodiment for fastening panels to one another, identical fasteners are used, as illustrated in FIGS. 1–3. With reference to FIG. 1, a fastener 1 is placed in an opening in a wall panel 2. A tapered panel plug 3 fits into an opening in panel 2, the periphery of the panel opening being tapered at an angle to match the taper of the panel plug 3, with the larger width on the front of the panel and the smaller width on the back of the panel. It should be noted that the opening and the panel plug may be rectangular or circular, the circular form being preferred. The back of the panel is the side of the panel facing a second panel, as later discussed, to which the first panel is fastened. Each fastener further comprises a cap 4 and, connected thereto, a boss 5, both of which freely rotate in the panel plug 3. The boss may have a square or hexagonal head to facilitate turning the fastener with a wrench. It may be removed after tightening of the fasteners, to provide a smooth front surface of the panel. The panel plug may have a recess for housing the cap, so that the front surface of the cap is flush with that of the panel plug, providing a smooth front surface of the panel. Alternatively, the front surface of the cap may be provided with a slot to enable rotating the cap with a screwdriver, crossed slots for rotating the cap with a Phillips head screwdriver, or a hexagonal recess for rotating the cap with an Allen wrench. Rigidly connected to the cap is a fastener rod 6 which comprises a straight section 6a, which passes through an opening in the panel plug, and a helically-wound section 6b. Optionally, a guide prong 7 is fastened to the straight section of the fastener rod 6a, for aligning pairs of fasteners before engaging each other, and a spacer tube 8, which also assists in aligning pairs of fasteners before engagement. The guide prong projects through the center of the helically-wound section of the fastener rod 6b. The spacer tube 8 encloses the straight portion of the fastener rod 6a and approximately one-half the length of the helically-wound section of the fastener rod 6b. The spacer tubes of two opposing fasteners, when the helically-wound sections of the fastener rods 6b engage, come in contact with one another and determine the spacing between the two panels being fastened to each other, as illustrated below.

FIG. 2 illustrates the helically-wound sections 6b of two fasteners engaged, and surrounded by spacer tubes 8 which ensure initial alignment when the fasteners are engaged, and which maintain the desired spacing between panels when the fasteners are tightened.

FIG. 3 illustrates two wall panels 2 fastened to each other by the fasteners of this invention. The spacer tubes 8 of the two fasteners are shown in contact with one another such that the sum of their lengths determines the clearance between the panels when fastened. Alternatively, a single spacer tube may be having a length equal to the desired clearance between the two panels when fastened to one another.

Pairs of panels which are to be fastened to each other are aligned such that the panel openings are opposite each other, and a fastener is inserted through each opening and through a section of spacer tube such that the helically-wound coil ends of the fastener rods come in contact. Turning one fastener while holding the other fastener stationary causes the helically-wound sections of the fastener rods to engage and to travel axially toward one another, tightening the connection between the fasteners and the panels to which they are attached, being eventually stopped from further movement by the spacer tubes which maintain the desired spacing between the panels.

Figure 4:
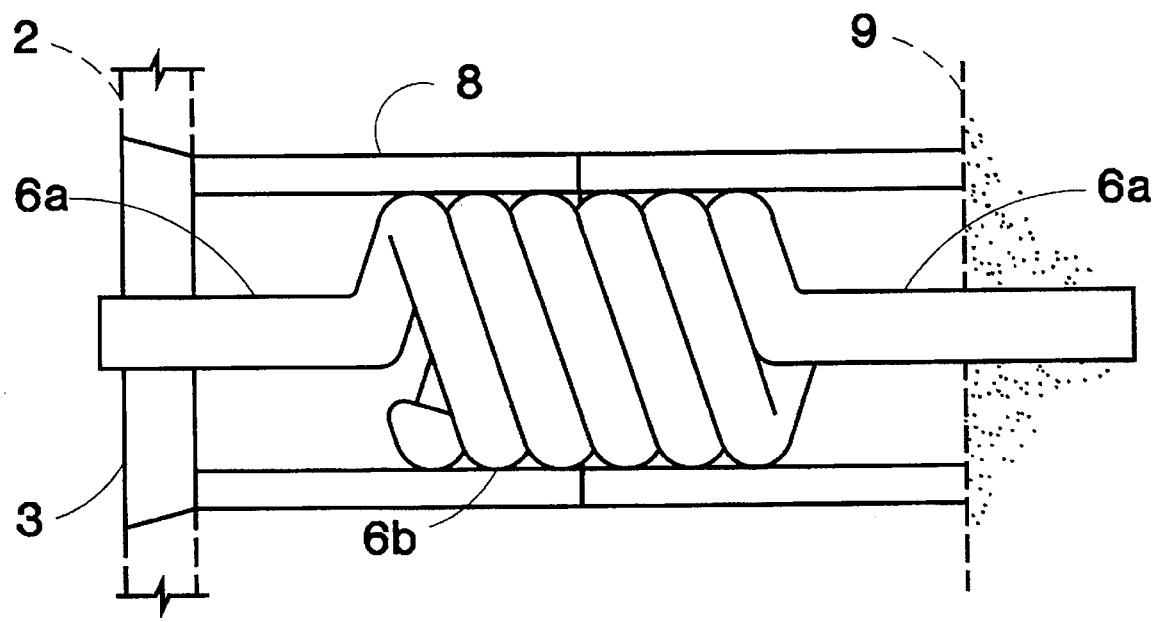
FIG. 4 is a side view of a panel being fastened to a wall.

FIG. 4 illustrates the manner in which panels may be fastened to walls by the fasteners of this invention. The straight portion 6a of one of the fasteners is connected to a wall 9, for example, by grouting. The second fastener is connected to a panel 2 as shown in FIG. 1, a spacer tube 8 is slipped over the first fastener, and the helically-wound sections of the fasteners are engaged and tightened by rotation of the second fastener. Turning the second fastener causes the helically-wound sections of the fasteners further to engage and travel axially towards one another, tightening the connection between the fasteners and fastening the panel to the wall until stopped from further movement by the spacer tube 8, which maintains the desired spacing between the panel and the wall.

The panels typically joined by the fasteners of this invention are fiberglass-reinforced, fine-aggregate concrete panels used for building forms for concrete placement. Their thickness typically is ½". The fastener rods typically are made of steel wire 0.1875" in diameter. The outside diameter of the helically-wound section of the fastener typically is about 1", and the pitch of the helically-wound section is 0.437" per turn, or 2.28 turns per inch in an axial direction. The spacer tube typically has an inside diameter just over 1". One-inch Schedule 40 pipe, steel, polyvinyl chloride, or polyethylene are preferred. The guide prong preferably is 0.06" diameter wire. It is to be understood that these dimensions and other specifications are by way of illustration only and in no manner limit the scope of this invention.

The fasteners of this invention may be used to fasten panels to structural steel, wall studs, floor joists, and the like by methods that will be obvious to those skilled in the art. For example, one fastener may be welded or bolted to a structural steel member, and the other fastener and spacer tube used to fasten a panel by the methods described. In addition to the fiberglass-reinforced fine-aggregate concrete panels mentioned above, fiberboard, chipboard, and steel and aluminum siding panels, auto body steel panels, and plastic panels used in automobile interiors may be fastened by the fasteners of this invention. In paper binders, the conventional screw-posts may be replaced by the fasteners of this invention.

While the invention has herein been shown and described in what is conceived to the most practical and preferred embodiment, it is recognized that departures may be made therefrom within the scope of the invention, which is not to be limited to the details disclosed herein, but is to be accorded the full scope of the claims so as to embrace any and all equivalent devices.

What is claimed is:

1. A pair of fasteners for fastening two parallel spaced panels to one another with a predetermined spacing therebetween, each fastener comprising:

(a) a fastener rod having a straight section and a helically-wound section; and (b) means for rotating the rod, said rotating means being rigidly fixed to an end of the straight section, and said rotating means to be disposed on the front of each panel through an opening therein;

whereby turning the rotating means engages two opposing helically-wound sections and causes the helically-wound sections to intertwine would rigidly hold the two parallel spaced panels in place.

2. A pair of fasteners according to claim 1 wherein the rotating means comprises:

(a) a panel plug fitted into the opening in each panel, the opening being of sufficient size to allow the insertion of the helically-wound section of the fastener rod therethrough, the panel plug being tapered inwardly around its periphery, with a wider side of the plug in the front of the panel, and with the periphery of the opening being tapered so as to match the taper of the panel plug, the panel plug having at its center an opening for passing the straight section of the fastener rod therethrough; and (b) a cap rigidly affixed to the end of the straight section of the fastener rod passing through the opening in the panel plug and being free to rotate therein.

3. A pair of fasteners according to claim 1 further comprising a spacer tube enclosing the straight and helically-wound sections of the fastener rods, said spacer tube having a predetermined length corresponding to the desired spacing between the panels.

4. A pair of fasteners according to claim 1 further comprising two spacer tubes each enclosing one fastener rod, the total length of the two spacer tubes combined being the desired spacing between the panels.

5. A pair of fasteners according to claim 2 wherein the panel plug and the opening in the panel are of rectangular shape.

6. A pair of fasteners according to claim 2 wherein the panel plug and the opening are of circular shape.

7. A pair of fasteners according to claim 2 wherein the panel plug has a recess on its wider side, concentric with the panel plug and sufficently large for housing the cap.

8. A pair of fasteners according to claim 2 wherein a boss is rigidly affixed to the cap for facilitating rotation of the fastener rod.

9. A pair of fasteners according to claim 2 further comprising a guide prong rigidly attached to the straight section of the fastener rod and projecting through the center of the helically-wound section of the fastener rod.

10. A pair of fasteners for fastening a panel parallel to a wall with a predetermined spacing therebetween, the first fastener comprising:

(a) a fastener rod having a straight section and a helically-wound section;

(b) means for rotating the rod, said rotating means being rigidly fixed to an end of the straight section, and said rotating means being disposed on the front of the panel through an opening therein;

and the second fastener comprising:

(c) a second fastener rod having a second straight section and a second helically-wound section, said second straight section being rigidly affixed to the wall;

whereby turning the rotating means on the first fastener engages the opposing helically-wound sections of the first and second fasteners and causes the helically-wound sections to intertwine and rigidly to fasten the panel to the wall.

11. A pair of fasteners according to claim 10 wherein the means of rotating the first fastener rod comprises:

(a) a panel plug fitted into an opening in the panel, the opening being of sufficient size to allow the insertion of the helically-wound section of the fastener rod therethrough, the panel plug being tapered inwardly around its periphery, with the wider side of the plug in the front of the panel, and with the periphery of the opening being tapered so as to match the taper of the panel plug, the panel plug having at its center an opening for passing the straight section of the fastener rod therethrough; and (b) a cap rigidly affixed to the end of the straight section of the fastener rod passing through the opening in the panel plug.

12. A pair of fasteners according to claim 10 further comprising a spacer tube enclosing the straight and helically-wound sections of the fastener rods, said spacer tube having a predetermined length corresponding to the desired spacing between the panel and the wall.

13. A pair of fasteners according to claim 10 further comprising two spacer tubes each enclosing one fastener rod, the total length of the two spacer tubes combined being the desired spacing between the panel and the wall.

14. A pair of fasteners according to claim 11 wherein the panel plug has a recess on its wider side, concentric with the panel opening and sufficiently large for housing the cap.

15. A pair of fasteners according to claim 11 wherein a boss is rigidly affixed to the cap for allowing rotation of the first fastener rod.

16. A pair of fasteners according to claim 11 each having a guide prong rigidly attached to the straight section of the fastener rod and projecting through the center of the helically-wound section of the fastener rod.

* * * * *